US009852035B2

(12) United States Patent
Harper et al.

(10) Patent No.: US 9,852,035 B2
(45) Date of Patent: Dec. 26, 2017

(54) HIGH AVAILABILITY DYNAMIC RESTART PRIORITY CALCULATOR

(71) Applicant: International Business Machines Corporation, Armonk, NY (US)

(72) Inventors: Richard E. Harper, Chapel Hill, NC (US); Valentina Salapura, Chappaqua, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/835,259

(22) Filed: Aug. 25, 2015

(65) Prior Publication Data

US 2017/0060707 A1   Mar. 2, 2017

(51) Int. Cl.
*G06F 11/00* (2006.01)
*G06F 11/20* (2006.01)
*G06F 9/455* (2006.01)
*G06F 11/14* (2006.01)

(52) U.S. Cl.
CPC ...... *G06F 11/2033* (2013.01); *G06F 9/45533* (2013.01); *G06F 11/1438* (2013.01); *G06F 2201/815* (2013.01)

(58) Field of Classification Search
CPC ............. G06F 11/0793; G06F 11/1438; G06F 11/1484; G06F 2009/4557; G06F 2009/45575; G06F 9/4856
See application file for complete search history.

(56) References Cited

U.S. PATENT DOCUMENTS

| 7,426,616 | B2* | 9/2008 | Keeton | G06F 11/1469 711/161 |
| 7,533,229 | B1 | 5/2009 | van Rietschote | |
| 8,413,144 | B1* | 4/2013 | Manmohan | G06F 11/301 714/1 |
| 8,589,727 | B1* | 11/2013 | Fletcher | G06F 11/3006 714/13 |
| 8,826,077 | B2 | 9/2014 | Bobak et al. | |

(Continued)

OTHER PUBLICATIONS

"VMware Distributed Resource Scheduler (DRS): Dynamic Load Balancing and Resource Allocation for Virtual Machines," Product Datasheet, VMware, Inc., copyright 2009, 3 pages.

(Continued)

*Primary Examiner* — Loan L. T. Truong
(74) *Attorney, Agent, or Firm* — Yee & Associates, P.C.; Louis J. Percello

(57) ABSTRACT

Restarting virtual machines is provided. Each server in a plurality of servers is monitored within a client virtual machine host environment via a network. In response to determining that a server failed in the plurality of servers within the client virtual machine host environment, a list of virtual machines that were executing in the failed server is retrieved. A set of virtual machine dependency groups for virtual machines in the list of virtual machines is retrieved based on properties corresponding to each respective virtual machine in the list of virtual machines. The set of virtual machine dependency groups is restarted in parallel on a failover server of an alternate virtual machine host environment via the network.

20 Claims, 10 Drawing Sheets

(56) References Cited

U.S. PATENT DOCUMENTS

| | | | |
|---|---|---|---|
| 8,966,318 B1* | 2/2015 | Shah | G06F 11/3664 714/28 |
| 9,213,572 B2* | 12/2015 | Farkas | G06F 9/485 |
| 2007/0088886 A1* | 4/2007 | Conner | G06F 13/1663 710/244 |
| 2007/0113218 A1* | 5/2007 | Nolan | G06F 11/362 717/124 |
| 2007/0240143 A1* | 10/2007 | Guminy | G06F 8/70 717/168 |
| 2009/0199177 A1* | 8/2009 | Edwards | G06F 9/5077 718/1 |
| 2010/0037089 A1* | 2/2010 | Krishnan | G06F 11/1484 714/5.11 |
| 2011/0314345 A1* | 12/2011 | Stern | G06F 11/3466 714/47.1 |
| 2012/0011493 A1* | 1/2012 | Singh | G06F 8/75 717/168 |
| 2012/0030670 A1* | 2/2012 | Vijay | G06F 9/45558 718/1 |
| 2012/0233501 A1* | 9/2012 | Kanso | G06F 11/008 714/26 |
| 2013/0007741 A1* | 1/2013 | Britsch | G06F 9/4401 718/1 |
| 2013/0124807 A1 | 5/2013 | Nielsen et al. | |
| 2013/0185716 A1* | 7/2013 | Yin | G06F 9/45558 718/1 |
| 2013/0246838 A1 | 9/2013 | Reddy | |
| 2014/0068609 A1* | 3/2014 | Breitgand | G06F 9/45533 718/1 |
| 2014/0245318 A1* | 8/2014 | Adams | G06F 9/5088 718/104 |
| 2014/0372788 A1* | 12/2014 | Vavrick | G06F 11/0793 714/4.1 |
| 2015/0074055 A1* | 3/2015 | Jacoby | G06F 17/30088 707/639 |
| 2015/0127970 A1 | 5/2015 | Bivens et al. | |
| 2015/0154046 A1* | 6/2015 | Farkas | G06F 9/485 718/1 |
| 2015/0277886 A1* | 10/2015 | Bronheim | G06F 8/61 717/174 |
| 2016/0321096 A1* | 11/2016 | Harper | G06F 9/45558 |

OTHER PUBLICATIONS

Brandle et al., "Cloud Computing Patterns of Expertise," International Business Machines Corporation, Red Paper, First Edition Jan. 2014, 242 pages.

Candea et al., "Crash-Only Software," Proceedings of the 9th Conference on Hot Topics in Operating Systems (HOTOS'03), May 2003, 6 pages.

Salapura et al., "ResilientVM: High Performance Virtual Machine Recovery in the Cloud," International Workshop on Automated Incident Management in Cloud (AIMC'15), Apr. 2015, pp. 7-12.

Schmidt et al., "vApp: A Standards-based Container for Cloud Providers," ACM SIGOPS Operating Systems Review, vol. 44, No. 4, Dec. 2010, pp. 115-123.

* cited by examiner

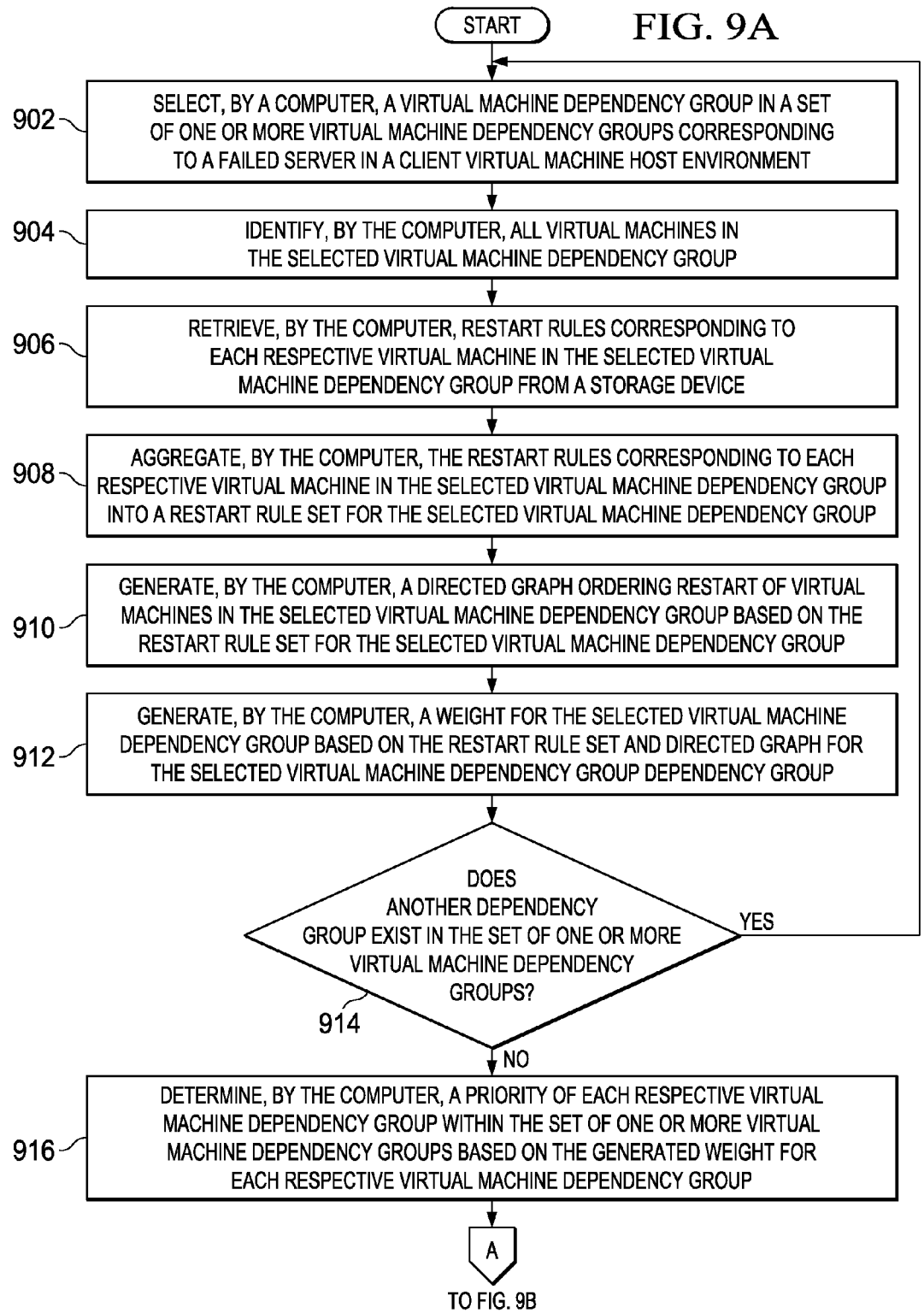

HIGH AVAILABILITY DYNAMIC RESTART PRIORITY CALCULATOR

BACKGROUND

1. Field

The disclosure relates generally to failure recovery in a virtual environment and more specifically to generating a parallelized, prioritized restart plan in the event of a failure occurring in the virtual environment.

2. Description of the Related Art

To achieve high availability in a virtual environment, virtual machines are pooled into clusters and the host environments the virtual machine clusters reside on are monitored for failure. In the event of a failure, the virtual machines on a failed host environment are restarted on an alternate host environment. If a virtual machine fails on a host environment that is functioning properly, then that failed virtual machine is reset on that same host environment.

The order in which virtual machines are restarted is determined by a virtual machine restart priority, which determines the relative order in which virtual machines are restarted after a host environment failure. Virtual machines are restarted sequentially on new host environments, with the highest priority virtual machines being restarted first and then continuing to those virtual machines with lower priority until all virtual machines are restarted or no more host environment resources are available. If the capacity needed to restart the failed virtual machines exceeds available capacity in the new host environment, it can happen that the virtual machines with lower priority will not be restarted. Virtual machines are restarted on a failover host environment, if one is specified.

SUMMARY

According to one illustrative embodiment, a computer-implemented method for restarting virtual machines is provided. A computer monitors each server in a plurality of servers within a client virtual machine host environment via a network. In response to the computer determining that a server failed in the plurality of servers within the client virtual machine host environment, the computer retrieves a list of virtual machines that were executing in the failed server. The computer determines a set of virtual machine dependency groups for virtual machines in the list of virtual machines based on properties corresponding to each respective virtual machine in the list of virtual machines. The computer restarts the set of virtual machine dependency groups in parallel on a failover server of an alternate virtual machine host environment via the network. According to other illustrative embodiments, a computer system and computer program product for restarting virtual machines are provided.

BRIEF DESCRIPTION OF THE DRAWINGS

FIGS. 9A-9B are a flowchart illustrating a process for determining virtual machine dependency group priority based on weight in accordance with an illustrative embodiment.

DETAILED DESCRIPTION

Figure 1:
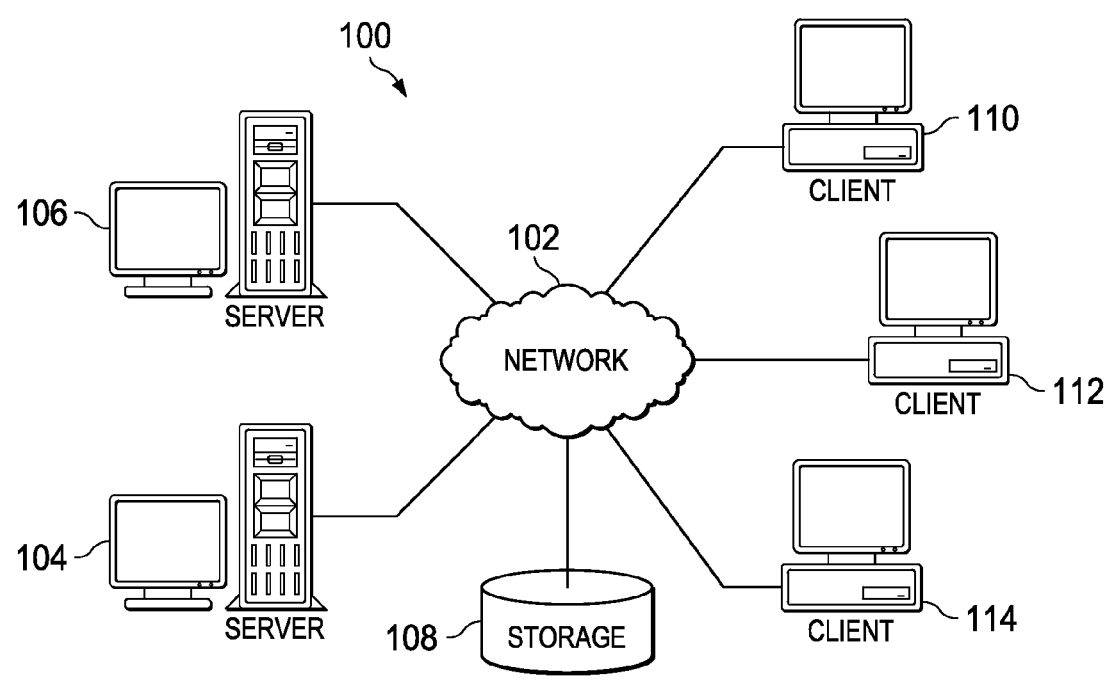
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
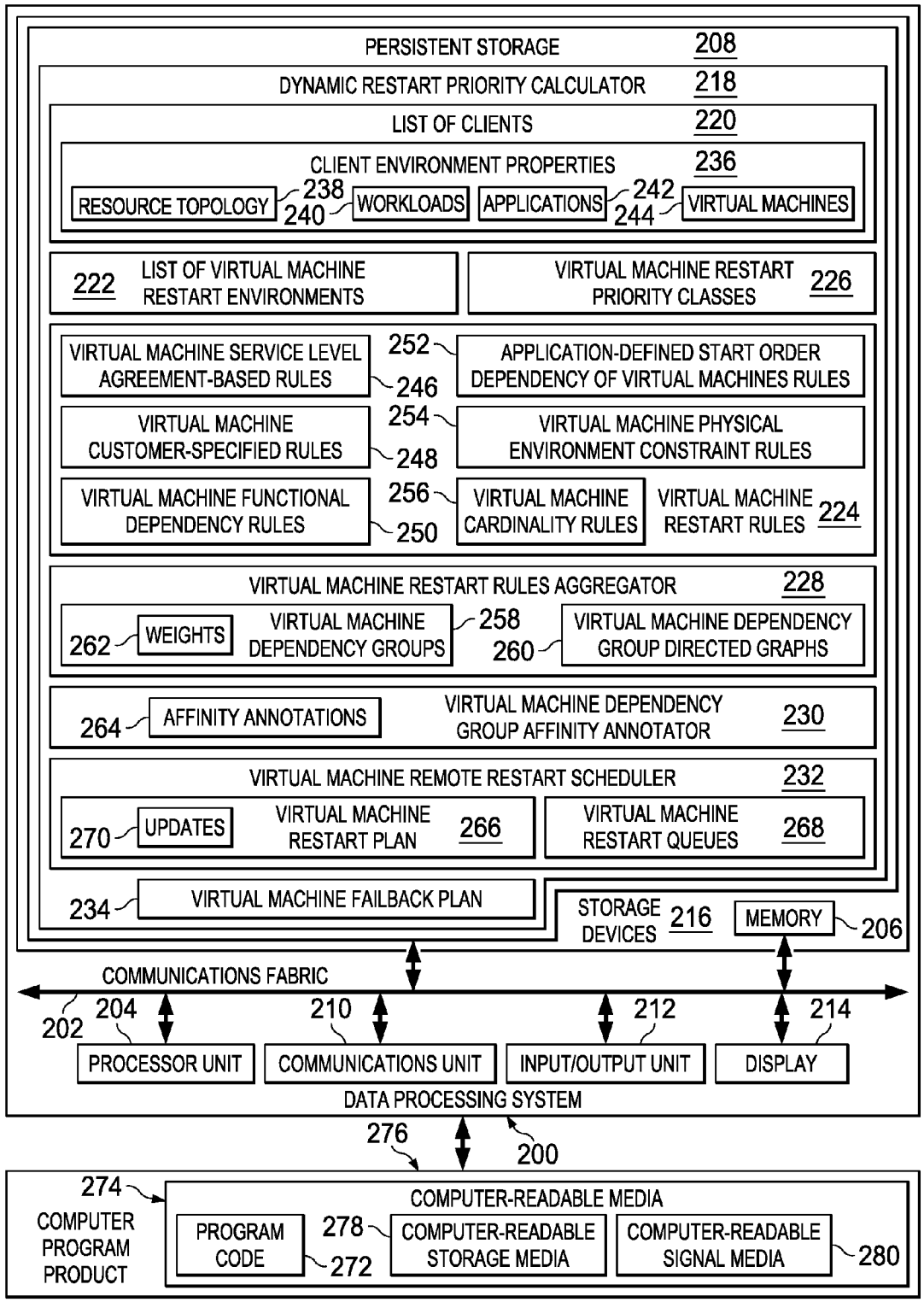
FIG. 2 is a diagram of a data processing system in which illustrative embodiments may be implemented.
Figure 3:
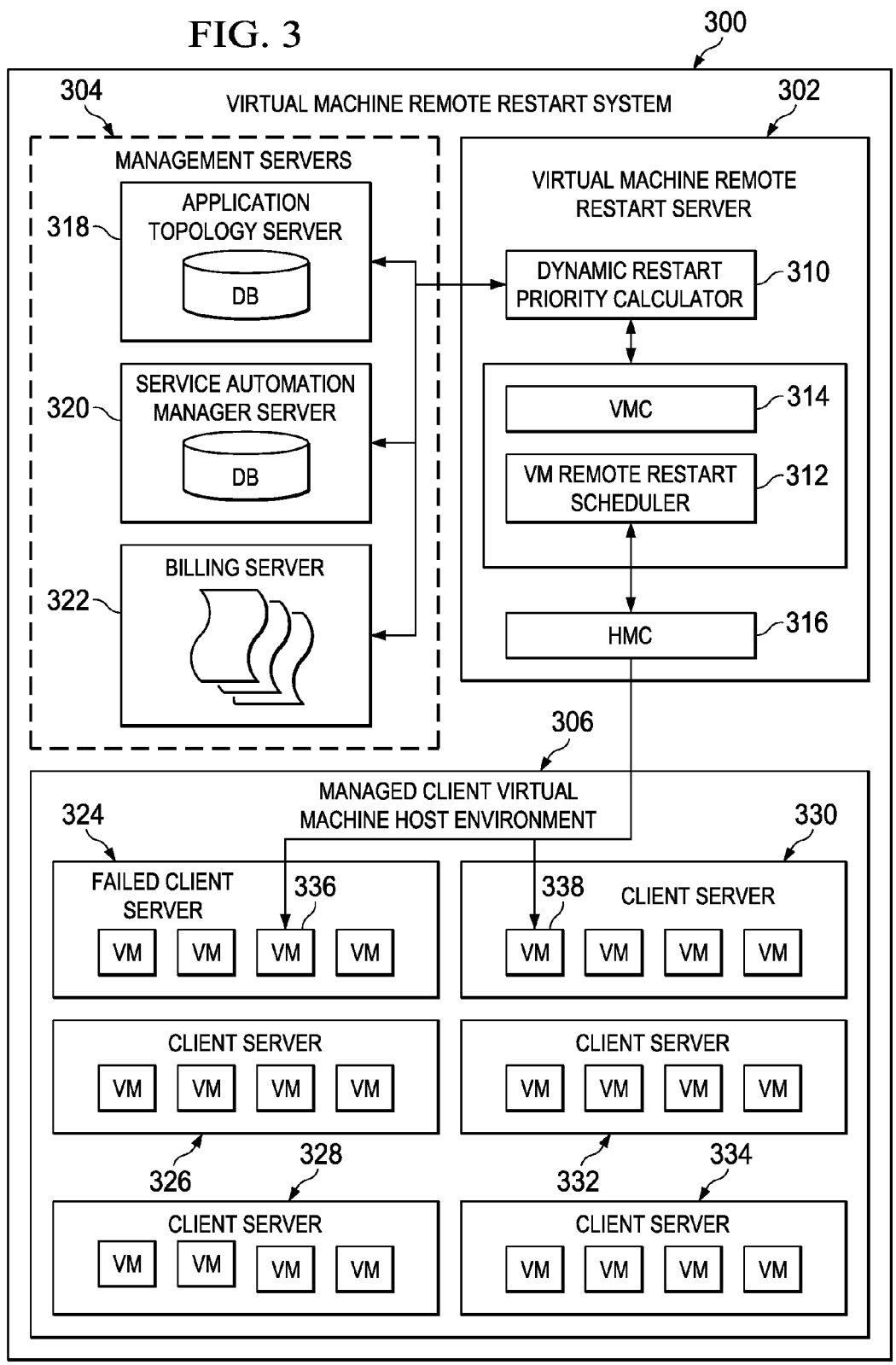
FIG. 3 is a diagram of an example of a virtual machine remote restart system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services, such as, for example, monitoring client virtual machine host environments for failure, generating a parallelized, prioritized restart plan in the event of a failure occurring in a client virtual machine host environment, and restarting virtual machines in an alternate virtual machine host environment based on the generated parallelized, prioritized restart plan.

Client 110, client 112, and client 114 also connect to network 102. Clients 110, 112, and 114 are clients of server 104 and server 106. Server 104 and server 106 may provide information, such as boot files, operating system images, software applications, and virtual machines to clients 110, 112, and 114.

In this example, clients 110, 112, and 114 each represent a different host virtual machine environment. A host virtual machine environment includes physical resources used to host and execute virtual machines to perform a set of one or more tasks or workloads. A host virtual machine environment may comprise, for example, one server, a cluster of servers, such as a data center, a cloud of computers, such as a private cloud, a public cloud, or a hybrid cloud, or any combination thereof. However, it should be noted that clients 110, 112, and 114 are intended as examples only. In other words, clients 110, 112, and 114 may include other types of data processing systems, such as, for example, network computers, desktop computers, laptop computers, tablet computers, handheld computers, smart phones, personal digital assistants, and gaming systems.

Storage 108 is a network storage device capable of storing any type of data in a structured format or an unstructured format. The type of data stored in storage 108 may be, for example, lists of client virtual machine host environments, client virtual machine host environment properties, lists of alternate virtual machine host environments, virtual machine restart rules, virtual machine restart plans, and virtual machine failback plans. Further, storage unit 108 may store other types of data, such as authentication or credential data that may include user names, passwords, and biometric data associated with system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores dynamic restart priority calculator 218. Dynamic restart priority calculator 218 monitors client virtual machine host environments for failure, generates virtual machine restart plans in the event of failures, controls restart of virtual machines on alternate virtual machine host environments after generating the restart plans, and generates virtual machine failback plans to restore the virtual machines on the client virtual machine host environments after recovery from failures.

Persistent storage 208 also stores list of clients 220, list of virtual machine restart environments 222, virtual machine restart rules 224, virtual machine restart priority classes 226, virtual machine restart rules aggregator 228, virtual machine dependency group affinity annotator 230, virtual machine remote restart scheduler 232, and virtual machine failback plan 234. However, it should be noted that different illustrative embodiments may store any other data to perform processes of the different illustrative embodiments.

List of clients 220 is a list of client virtual machine host environments, such as, for example, clients 110-114 in FIG. 1. Dynamic restart priority calculator 218 utilizes list of clients 220 to keep track of which client virtual machine host environments to monitor for failure. List of clients 220 may include, for example, client environment properties 236. Client environment properties 236 provide the different attributes or features of each different client virtual machine host environment. Client environment properties 236 may include, for example, resource topology 238, workloads 240, applications 242, and virtual machines 244.

Resource topology 238 provides a description of the physical resources of each different client virtual machine host environment. Workloads 240 provide a description of the different tasks being performed on each different client virtual machine host environment. Applications 242 provide a list and description of each different application performing the different tasks in each of the different client virtual machine host environments. Virtual machines 244 provide a list and description of each of the virtual machines being used by each of the different applications in applications 242.

List of virtual machine restart environments 222 is a list of alternate virtual machine host environments that dynamic restart priority calculator 218 may utilize to restart virtual machines on from failed client virtual machine host environments.

Virtual machine restart rules 224 are rules that define restart order of virtual machines. Virtual machine restart rules 224 may include, for example, virtual machine service level agreement-based rules 246, virtual machine customer-specified rules 248, virtual machine functional dependency rules 250, application-defined start order dependency of virtual machines rules 252, virtual machine physical environment constraint rules 254, and virtual machine cardinality rules 256. Virtual machine service level agreement-based rules 246 may define, for example, restart priorities for different respective virtual machines. Virtual machine customer-specified rules 248 may define, for example, restart orders for different respective virtual machines. Virtual machine functional dependency rules 250 may define, for example, virtual machine restart order dependencies based on achieving the proper functioning of different respective virtual machines. For example, virtual machine functional dependency rules 250 may state that virtual machine B must be restarted prior to virtual machine A in order for virtual machine A to function properly.

Application-defined start order dependency of virtual machines rules 252 may define, for example, a particular restart order for a set of virtual machines being used by a particular application. Virtual machine physical environment constraint rules 254 may define, for example, where each particular virtual machine may be located within servers, racks of servers, data centers, or clouds. Virtual machine cardinality rules 256 may define, for example, a minimum and a maximum number of instances of each particular virtual machine that needs to be generated for a particular workload.

Virtual machine restart priority classes 226 specify a restart priority order for virtual machines. The virtual machine priority classes may be, for example, a high priority class, a medium priority class, and a low priority class for virtual machines. Dynamic restart priority calculator 218 restarts virtual machines in a high priority class prior to starting virtual machines in a medium priority class and restarts virtual machines in the medium priority class prior to restarting virtual machines in a low priority class.

Virtual machine restart rules aggregator 228 aggregates or combines individual restart rules corresponding to virtual machines into a restart rule set. Virtual machine restart rules aggregator 228 uses the aggregated restart rule set to generate virtual machine dependency groups 258. A virtual machine dependency group is a set of two or more virtual machines that have one or more start order interdependencies between them and are used to perform a workload.

Virtual machine restart rules aggregator 228 also generates virtual machine dependency group directed graphs 260 for each virtual dependency group in virtual machine dependency groups 258. Virtual machine dependency group directed graphs 260 illustrate a restart dependency order of the virtual machines of each corresponding virtual machine dependency group in virtual machine dependency groups 258. In addition, virtual machine restart rules aggregator 228 calculates weights 262 for virtual machine dependency groups 258 based on virtual machine restart priority classes 226 of virtual machines in each virtual machine dependency group. Weights 262 may be native weights of each virtual machine in a particular virtual machine dependency group or may be inherited weights shared by virtual machines in a particular virtual machine dependency group.

Virtual machine dependency group affinity annotator 230 may receive affinity annotations 264 from, for example, a system administrator. Alternatively, virtual machine dependency group affinity annotator 230 may receive affinity annotations 264 from dynamic restart priority calculator 218. Affinity annotations 264 define physical placement requirements of different virtual machine dependency groups. For example, a virtual machine affinity annotation may require that virtual machine dependency group A be placed in a container within a server device that is adjacent to a container including virtual machine dependency group B within the same server device.

Dynamic restart priority calculator 218 utilizes virtual machine remote restart scheduler 232 to generate virtual machine restart plan 266 and to schedule and enqueue virtual machines within virtual machine restart queues 268 for processing. In addition, virtual machine remote restart scheduler 232 generates updates 270 for virtual machine restart plan 266 on, for example, a predefined time interval basis (e.g., daily, weekly, monthly), on demand, or as needed (i.e., when a failure occurs in a client virtual machine host environment). Further, dynamic restart priority calculator 218 generates virtual machine failback plan 234. Virtual machine failback plan 234 is a plan to restart virtual machine back on a client virtual machine host environment after recovery from a failure.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as a system administrator, and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 272 is located in a functional form on computer readable media 274 that is selectively removable and may be loaded onto or transferred to data processing system 200 for running by processor unit 204. Program code 272 and computer readable media 274 form computer program product 276. In one example, computer readable media 274 may be computer readable storage media 278 or computer readable signal media 280. Computer readable storage media 278 may include, for example, an optical or magnetic disc that is inserted or placed into a drive or other device that is part of persistent storage 208 for transfer onto a storage device, such as a hard drive, that is part of persistent storage 208. Computer readable storage media 278 also may take the form of a persistent storage, such as a hard drive, a thumb drive, or a flash memory that is connected to data processing system 200. In some instances, computer readable storage media 278 may not be removable from data processing system 200.

Alternatively, program code 272 may be transferred to data processing system 200 using computer readable signal media 280. Computer readable signal media 280 may be, for example, a propagated data signal containing program code 272. For example, computer readable signal media 280 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 272 may be downloaded over a network to persistent storage 208 from another device or data processing system through computer readable signal media 280 for use within data processing system 200. For instance, program code stored in a computer readable storage media in a data processing system may be downloaded over a network from the data processing system to data processing system 200. The data processing system providing program code 272 may be a server computer, a client computer, or some other device capable of storing and transmitting program code 272.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 278 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that a schedule needs to be formulated to restart a large collection of interdependent virtual machines on a large collection of host resources, in either an high availability or a disaster recovery solution, such that: 1) recovery time objectives are met; 2) the maximum number of the most important virtual machine dependency groups is restarted; 3) the virtual machines within a particular virtual machine dependency group are started in the proper order; 4) the capabilities of the host environment, such as, for example, restart bandwidth and capacities, are not exceeded; and 5) a failback plan needs to be formulated from the alternate disaster recovery host environment to the original primary host environment or to a new primary host environment. Because the recovery capabilities of the primary host environment may different from the alternate disaster recovery host environment, illustrative embodiments generate a virtual machine restart plan.

Illustrative embodiments generate a comprehensive restart priority order for restarting virtual machines in the event of a server failure in a client virtual machine host system environment. However, it should be noted that even though virtual machines are used as examples in this specification, illustrative embodiments are not limited to such. For example, alternative illustrative embodiments may restart other types of resources, such as, for example, bare-metal servers in the event of a failure.

Illustrative embodiments take into account several factors when calculating a restart plan for virtual machines, such as, for example, available capacity in an alternate virtual machine host system environment, service level agreement requirements for virtual machines in a cluster or group, knowledge about applications running on the virtual machines, such as start order dependency of virtual machines defined by the applications, and functional dependency of the virtual machines. Based on these factors, illustrative embodiments calculate dependency groups and priority order for the virtual machines in order to restart the virtual machines in a specific order on the alternate virtual machine host system environment so that the client's workload is restarted with minimal delay.

Based on collected information and specified restart rules, illustrative embodiments determine a restart priority of each virtual machine to be restarted to generate the parallelized, prioritized restart plan. Illustrative embodiments utilize parallelizable virtual machine restart priority classes and restart rules language. Illustrative embodiments also utilize a multidimensional constrained optimization algorithm to schedule the virtual machine restart priority classes on physical resources, such as servers, in parallel, and take into account physical environment constraints, such as collocation and anti-collocation of virtual machines.

Virtual machine restart priority is a partial ordering of all the virtual machines, which were affected by the failure in the client host environment, into the restart priority classes. Illustrative embodiments restart each of the virtual machines within a particular restart priority class in parallel subject to restart parellelism constraints of physical resources of the alternate host environment and application-defined virtual machine start order dependencies. Restart time for a particular virtual machine is a function of that particular virtual machine and the alternate host environment, which that particular virtual machine will be restarted on. The restart rules language allows for customization of virtual machine restart priority based on the restart rules. A discovery tool may, for example, automatically populate a virtual machine restart rule template. Alternatively, a system administrator may manually populate the virtual machine restart rule template.

Illustrative embodiments automatically and dynamically determine virtual machine priority based on a number of virtual machine properties. The virtual machine properties may include, for example, service level agreement requirements for virtual machines, application-defined virtual machine start order priorities, application topology, and other rules as determined by illustrative embodiments and a given set of restart rules. Illustrative embodiments also utilize restart priority aggregation rules to convert various restart rules corresponding to particular virtual machines into a virtual machine restart partial priority order, while taking into account application dependencies.

Thus, illustrative embodiments may be used to schedule and effect virtual machine restarts in the event of a failure and upon a failback to the original client host environment after recovery from the failure. Illustrative embodiments also may be used to periodically update disaster recovery restart plans as original client workloads change over time and may be used to provide a verification of the feasibility of recovering all of a client's workload after a failure. Verification of the feasibility of recovery may include, for example, illustrative embodiments making calculations as to whether particular virtual machine recovery plans are possible and sending a system administrator a result of such calculations.

Virtual machine restart rules are statements that place virtual machines into a priority class and provide virtual machine dependency group mappings based on, for example, service level agreement and/or customer-specified virtual machine priority; functional dependencies between virtual machines; application-defined start order dependencies between virtual machines; and physical location constraints for different virtual machines. A collection or set of virtual machine restart rules is embodied in a restart rule set. A discovery tool may, for example, populate a restart rule set or a system administrator may manually populate the restart rule set. It should be noted that a discovery tool may not provide all needed inputs, such as, for example, virtual machine cardinality and collocation. Discovery scope may determine the contents of a restart rule set and the restart rule set may contain restart rules pertaining to multiple virtual machine dependency groups.

Examples of restart rule language are as follows:

VM[i].SLA=H (i.e., a service level agreement specifies that virtual machine VM[i] is in a High Priority Class).

VM[i].StartOrderDependency=VMN (i.e., virtual machine VM[i] cannot be started before virtual machines VM[*]).

VM[i].FunctionalDependency=VMN (i.e., virtual machine VM[i] requires virtual machines VM[*] to function prior to restart, but this rule does not imply start order dependency).

VM[i].MustAnticollocate=VMN (i.e., virtual machine VM[i] cannot reside in a same server container as virtual machines VM[*]).

VM[i].MustCollocate=VMN (i.e., virtual machine VM[i] must reside in a same server container as virtual machines VM[*]).

VM[i].Cardinality={min, max} (i.e., at least a minimum number of instances of virtual machine VM[i] must be generated for a particular dependency group and no more than a maximum number of instances of virtual machine VM[i] need be generated).

Illustrative embodiments utilize restart rule aggregation for combining all the individual restart rules within a restart rule set in order to generate a collection of dependency group directed graphs, which illustrate the parallelism and prioritization of virtual machine restarts. Illustrative embodiments take into account individual dependencies between virtual machines and priorities of the virtual machines within a particular dependency group. Illustrative embodiments generate multiple virtual machine dependency groups if they exist within a restart rule set. Also, illustrative embodiments generate a weight for each virtual machine dependency group to provide guidance in prioritizing the multiple virtual machine dependency groups.

With reference now to FIG. 3, a diagram of an example of a virtual machine remote restart system is depicted in accordance with an illustrative embodiment. Virtual machine remote restart system 300 is a system of components for restarting virtual machines from a failed client host environment onto an alternate host environment. Virtual machine remote restart system 300 may be implemented in a network of data processing systems, such as, for example, network data processing system 100 in FIG. 1.

In this example, virtual machine remote restart system 300 includes virtual machine remote restart server 302, management servers 304, and managed client virtual machine host environment 306. However, it should be noted that virtual machine remote restart system 300 may include more or fewer components than illustrated. For example, virtual machine remote restart system 300 may include a plurality of virtual machine remote restart servers and managed client virtual machine host environments.

Virtual machine remote restart server 302 may be, for example, server 104 in FIG. 1 or data processing system 200 in FIG. 2. In this example, virtual machine remote restart server 302 includes dynamic restart priority calculator 310, virtual machine remote restart scheduler 312, virtual machine center 314, and hardware management console 316. However, it should be noted that virtual machine remote restart server 302 may include more or fewer components than illustrated. For example, two or more components may be combined into a single component within virtual machine remote restart server 302. Alternatively, virtual machine center 314 and hardware management console 316 may be located on one or more other network computers or data processing systems, for example.

Dynamic restart priority calculator 310 may be, for example dynamic restart priority calculator 218 in FIG. 2. Dynamic restart priority calculator 310 monitors each of the servers in managed client virtual machine host environment 306 for failure. In the event that a failure is detected, dynamic restart priority calculator 310 generates a virtual machine restart plan and utilizes virtual machine remote restart scheduler 312 to schedule and control restart of virtual machines from virtual machine center 314 on managed client virtual machine host environment 306 via hardware management console 316.

Management servers 304 store data that dynamic restart priority calculator 310 may utilize to calculate virtual machine restart priority rules for generating virtual machine restart plans. In this example, management servers 304 include application topology server 318, service automation manager server 320, and billing server 322. However, it should be noted that different illustrative embodiments may utilize many different types and numbers of management servers. Application topology server 318 stores information regarding topologies for various applications. Service automation manager server 320 stores information regarding service level agreements associated with each virtual machine and/or each virtual machine's native restart priority. Billing server 322 stores information regarding various clients for billing purposes and may detect when service level agreements are not met.

In this example, managed client virtual machine host environment 306 includes failed client server 324, client server 326, client server 328, client server 330, client server 332, and client server 334. However, it should be noted that managed client virtual machine host environment 306 may include any number of servers, such as, for example, 10, 50, 100, 1,000, or more servers. Also in this example, dynamic restart priority calculator 310, using virtual machine remote restart scheduler 312 and hardware management console 316, determines client server 330 as the target server to restart virtual machine 336 of failed client server 324 on failover client server 330 as virtual machine 338.

Figure 4:
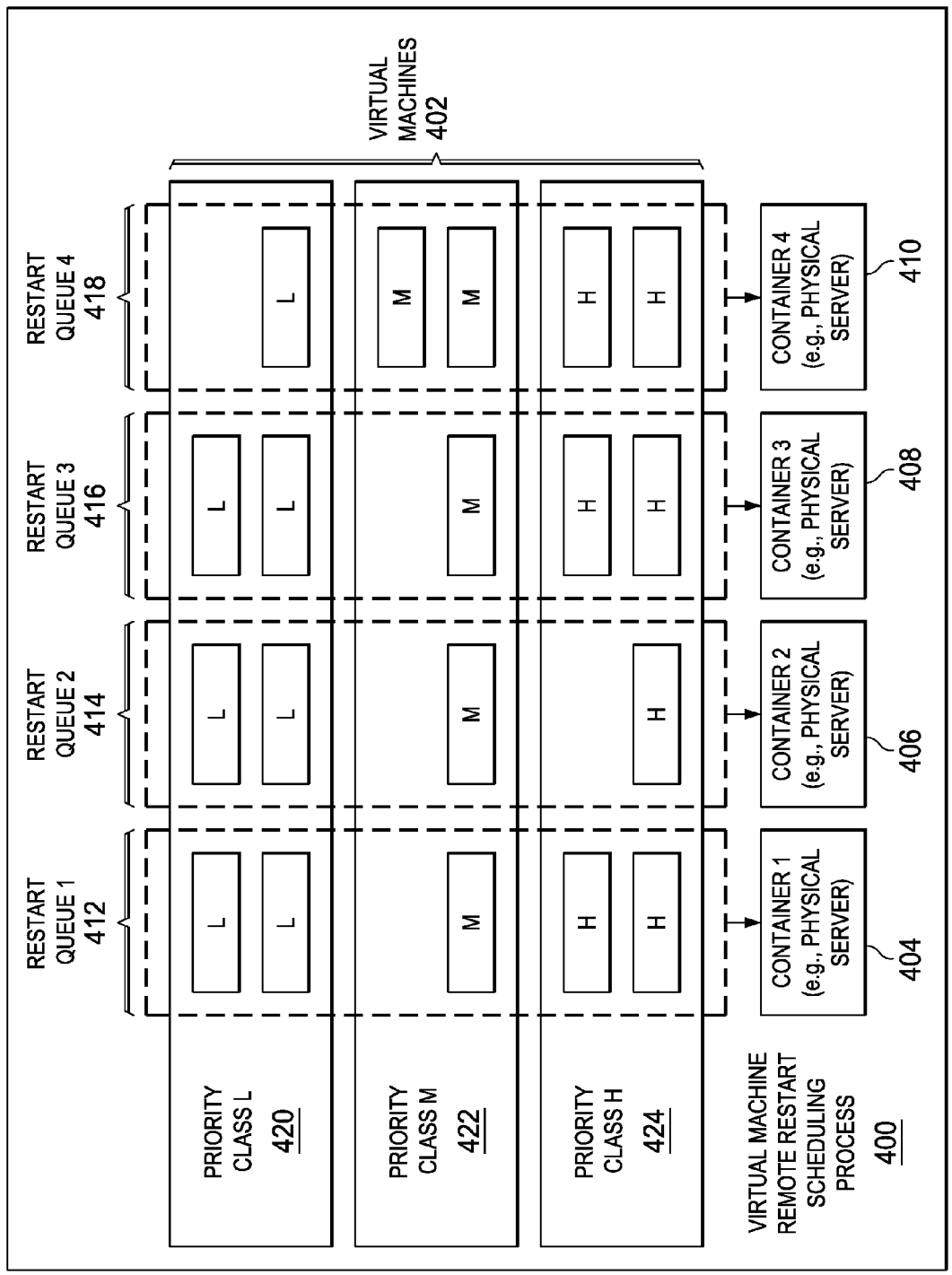
FIG. 4 is a diagram of an example of a virtual machine remote restart scheduling process in accordance with an illustrative embodiment.

With reference now to FIG. 4, a diagram of an example of a virtual machine remote restart scheduling process is depicted in accordance with an illustrative embodiment. Virtual machine remote restart scheduling process 400 may be implemented in a dynamic restart priority calculator, such as, for example, dynamic restart priority calculator 218 in FIG. 2. In this example, virtual machine remote restart scheduling process 400 includes virtual machines 402, container 1 404, container 2 406, container 3 408, container 4 410, restart queue 1 412, restart queue 2 414, restart queue 3 416, restart queue 4418, priority class Low 420, priority class Medium 422, and priority class High 424.

Virtual machines 402 may be, for example, virtual machines 244 in FIG. 2. Container 1 404, container 2 406, container 3 408, and container 4 410 each may be, for example, physical servers, such as failover client servers 330-334 in FIG. 3. Restart queue 1 412, restart queue 2 414, restart queue 3 416, and restart queue 4 418 may be, for example, virtual machine restart queues 268 in FIG. 2. Priority class Low 420, priority class Medium 422, and priority class High 424 may be, for example, virtual machine restart priority classes 226 in FIG. 2.

Parallelizable priority class Low 420, priority class Medium 422, and priority class High 424 are a partial ordering of all virtual machines 402 that need to be restarted into Low, Medium, and High priority classes. Virtual machine remote restart scheduling process 400 may start virtual machines 402 within a particular priority class in parallel on restart queue 1 412, restart queue 2 414, restart queue 3 416, and restart queue 4 418 subject to infrastructure limitations and start order dependencies. Virtual machine remote restart scheduling process 400 places a particular virtual machine into a particular restart priority class based on the results of a restart rule aggregation process. Virtual machine remote restart scheduling process 400 places a particular virtual machine into a particular restart queue to maximize parallelism and minimize overall restart time.

In this example, assume N number of singleton (i.e., no inter-virtual machine dependencies) virtual machines with High, Medium, and Low class attributes. Also, given M-way restart parallelism, assume one concurrent virtual machine restart per server container with four server containers in this example.

Figure 5:
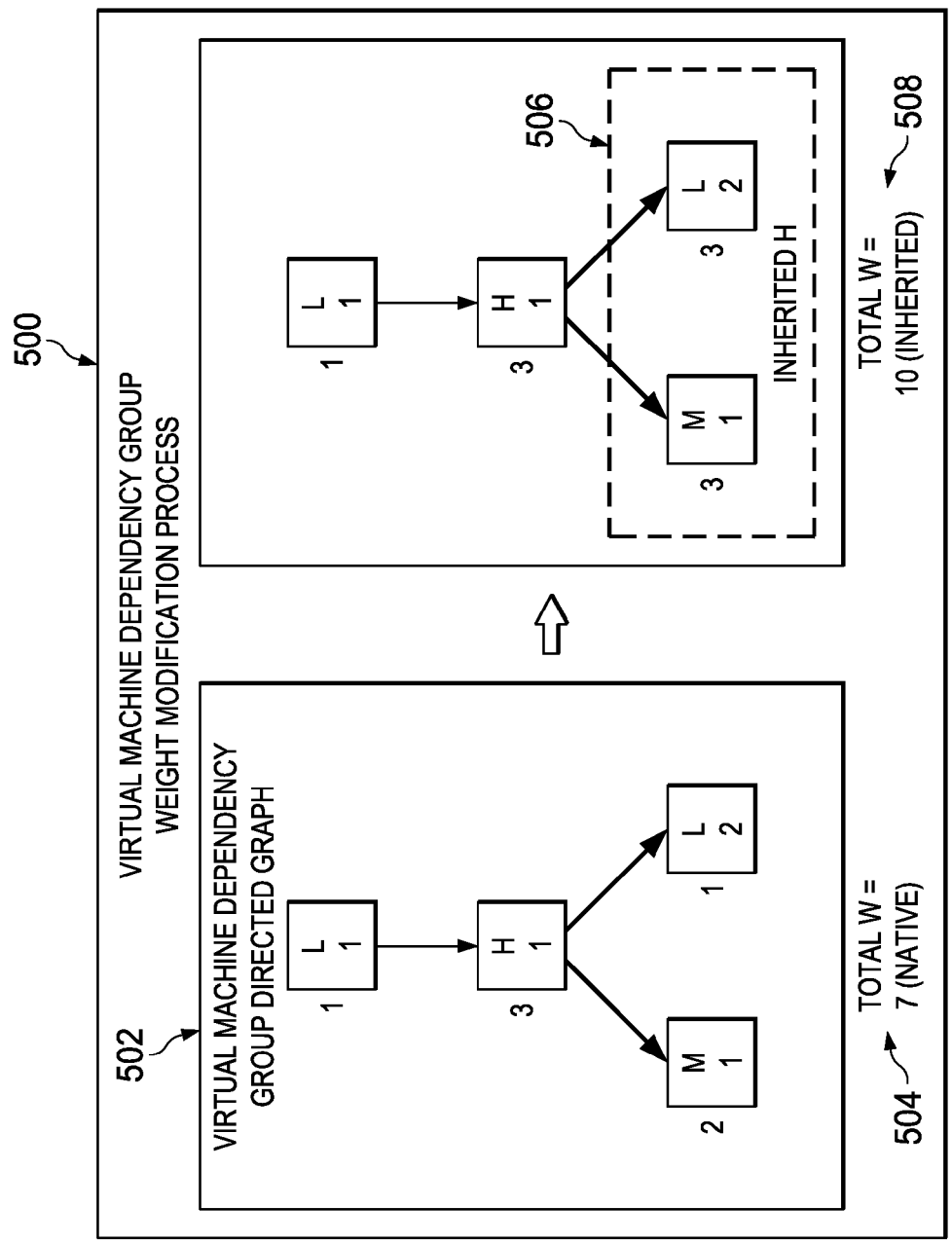
FIG. 5 is a diagram of an example of a virtual machine dependency group weight modification process in accordance with an illustrative embodiment.

With reference now to FIG. 5, a diagram of an example of a virtual machine dependency group weight modification process is depicted in accordance with an illustrative embodiment. Virtual machine dependency group weight modification process 500 may be implemented in a dynamic restart priority calculator, such as, for example, dynamic restart priority calculator 218 in FIG. 2.

A set of virtual machines in a dependency group typically has some application-defined restart relationships. All virtual machines of a dependency group must be started for the application to function properly. Therefore, it is of no use to start only a part of a dependency group. A dependency group may represent a client workload or a client business function, such as, for example a payroll function, an email function, a billing function, or an SAP landscape function.

In this example, virtual machine dependency group weight modification process 500 modifies virtual machine weights within a dependency group having a start order dependency using a priority inheritance algorithm. Virtual machine dependency group weight modification process 500 shows virtual machine dependency group directed graph 502. Virtual machine dependency group directed graph 502 may be, for example, a virtual machine dependency group directed graph in virtual machine dependency group directed graphs 260 in FIG. 2.

In this example, virtual machine dependency group directed graph 502 includes virtual machine L1 with a native weight of 1, virtual machine H1 with a native weight of 3, virtual machine M1 with a native weight of 2, and virtual machine L2 with a native weight of 1. Also shown in this example, virtual machine L1 has a functional dependency on virtual machine H1 and virtual machine H1 has a start order dependency on virtual machine M1 and virtual machine L2. The total native weight for the dependency group is 7 as shown at 504.

Also shown in this example, virtual machine dependency group weight modification process 500 modifies the native weights of virtual machine M1 and virtual machine L2 to a 3 by inheriting the weight from virtual machine H1 at 506 because of the start order dependency. As a result, the dependency group now has a total inherited weight of 10 as shown at 508.

Figure 6:
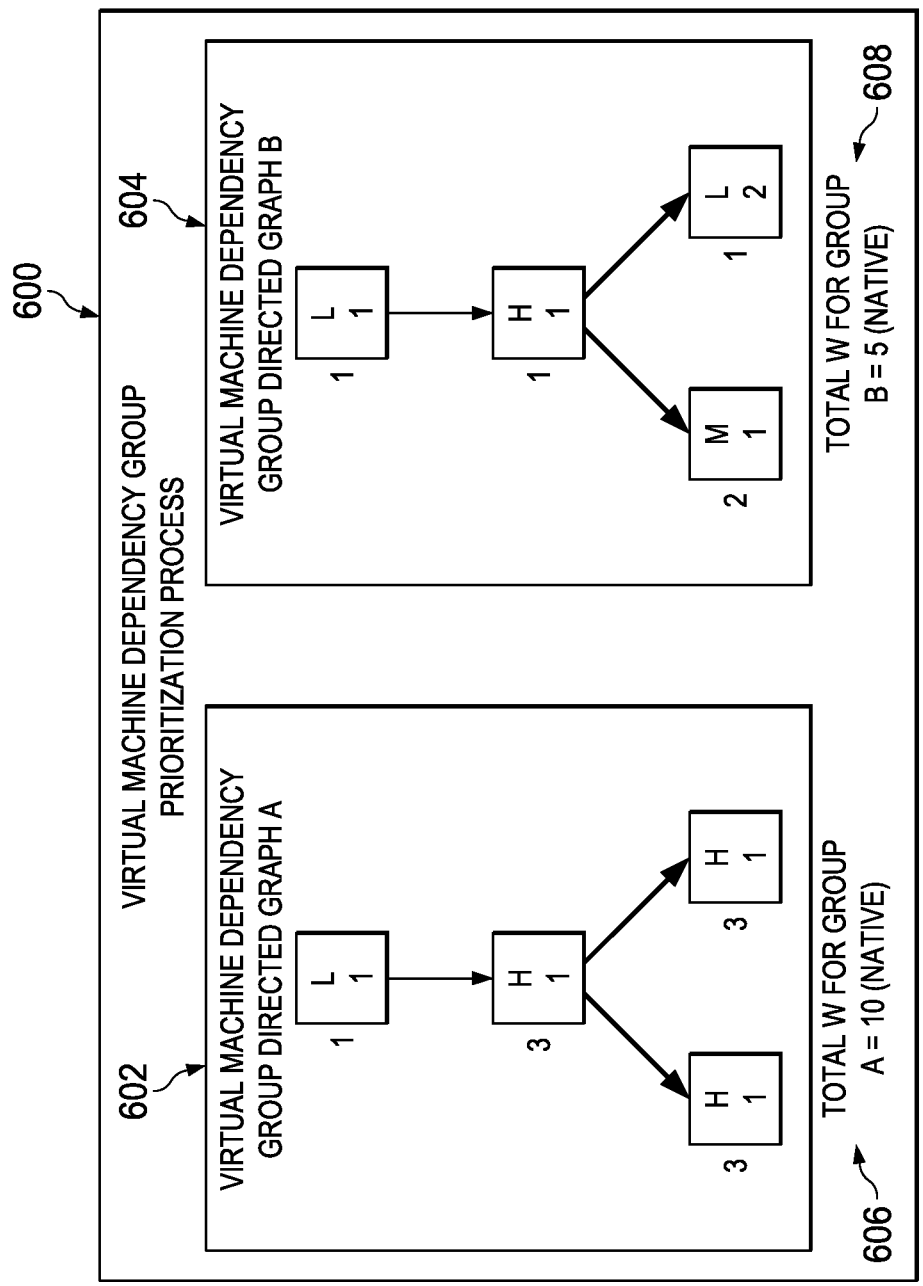
FIG. 6 is a diagram of an example of a virtual machine dependency group prioritization process in accordance with an illustrative embodiment.

With reference now to FIG. 6, a diagram of an example of a virtual machine dependency group prioritization process is depicted in accordance with an illustrative embodiment. Virtual machine dependency group prioritization process 600 may be implemented in a dynamic restart priority calculator, such as, for example, dynamic restart priority calculator 218 in FIG. 2. In this example, virtual machine dependency group prioritization process 600 shows virtual machine dependency group directed graph A 602 and virtual machine dependency group directed graph B 604.

Virtual machine dependency group directed graph A 602 has a total native weight of 10 as shown at 606. Virtual machine dependency group directed graph B 604 has a total native weight of 5 as shown at 608. Virtual machine dependency group prioritization process 600 prioritizes all dependency groups by total weight. For example, virtual machine dependency group prioritization process 600 places virtual machine dependency group directed graph A 602 before virtual machine dependency group directed graph B 604.

Figure 7:
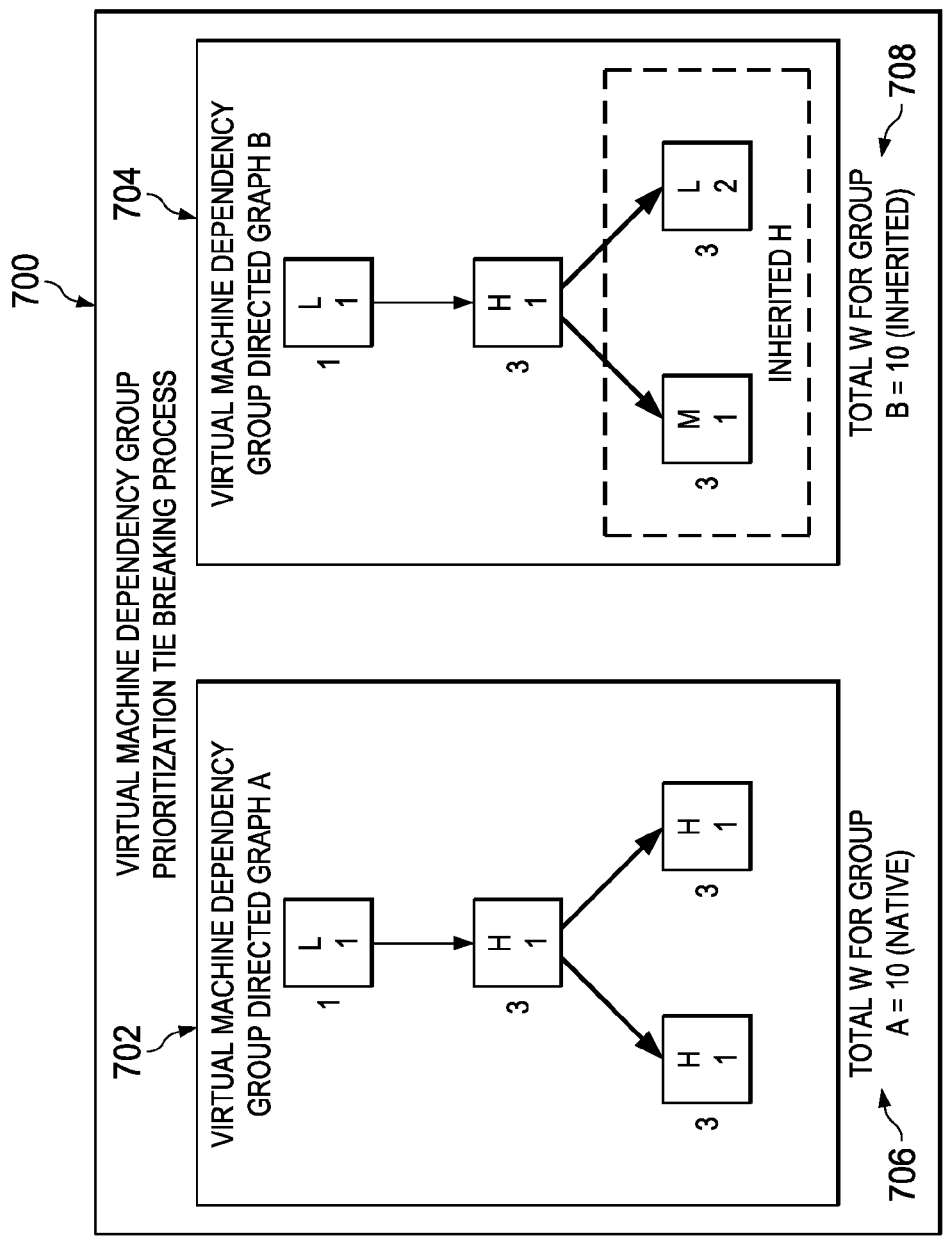
FIG. 7 is a diagram of an example of a virtual machine dependency group prioritization tie breaking process in accordance with an illustrative embodiment.

With reference now to FIG. 7, a diagram of an example of a virtual machine dependency group prioritization tie breaking process is depicted in accordance with an illustrative embodiment. Virtual machine dependency group prioritization tie breaking process 700 may be implemented in a dynamic restart priority calculator, such as, for example, dynamic restart priority calculator 218 in FIG. 2. In this example, virtual machine dependency group prioritization tie breaking process 700 shows virtual machine dependency group directed graph A 702 and virtual machine dependency group directed graph B 704.

Virtual machine dependency group directed graph A 702 has a total native weight of 10 as shown at 706. Virtual machine dependency group directed graph B 704 has a total inherited weight of 10 as shown at 708 because of start order dependency of virtual machine H1 on virtual machine M1 and virtual machine L2. Virtual machine dependency group prioritization tie breaking process 700 breaks ties by preferring native total weight over inherited total weight. For example, virtual machine dependency group prioritization tie breaking process 700 prioritizes virtual machine dependency group directed graph A 702 before virtual machine dependency group directed graph B 704.

Once the dynamic restart priority calculator, such as, for example, dynamic restart priority calculator 310 in FIG. 3, automatically generates the virtual machine dependency groups from an aggregated virtual machine restart rule set, a system administrator may, for example, manually annotate the virtual machine dependency groups to indicate mutual virtual machine dependency group affinity requirements. Alternatively, a virtual machine dependency group affinity annotator, such as, for example, virtual machine dependency group affinity annotator 230 in FIG. 2, may automatically annotate the different virtual machine dependency groups.

An example of an affinity annotation may be that the dynamic restart priority calculator should locate virtual machine dependency group A near virtual machine dependency group B. Locating one dependency group "near" another dependency group may mean, for example, placing the two dependency groups in the same physical server, same server rack, same server pod that is managed as a single server, same data center, or same cloud. As another example, the dynamic restart priority calculator should not locate virtual machine dependency group A near virtual machine dependency group B, but should locate the two dependency groups in the same data center or cloud. As a further example, the dynamic restart priority calculator should locate virtual machine dependency group A and virtual machine dependency group B in different data centers or clouds. If a particular data center or cloud exposes locale physical resource heterogeneity, then the dynamic restart priority calculator takes into account these virtual machine dependency group annotations in determining virtual machine dependency group restart placement and scheduling.

One example of virtual machine dependency group restart scheduling is to schedule one virtual machine dependency group at a time. One objective of scheduling one virtual machine dependency group at a time is to place highest weighted (i.e., highest cumulative priority) virtual machine dependency groups first. The dynamic restart priority calculator separates the different virtual machine dependency groups into anti-affine groups according to the affinity annotation of each respective virtual machine dependency group. An anti-affine group is a set of two or more virtual machine dependency groups that must be placed near or adjacent to one another. In addition, the dynamic restart priority calculator selects a physical location to restart the anti-affine groups.

For each anti-affine group, the dynamic restart priority calculator sorts virtual machine dependency groups from highest to lowest dependency group weight. For each virtual machine dependency group within an anti-affine group, the dynamic restart priority calculator estimates whether a virtual machine dependency group will fit in the selected physical location to restart the anti-affine group. The dynamic restart priority calculator may utilize, for example, a trial fit algorithm to determine whether a virtual machine dependency group will fit in the selected physical location. Further, the dynamic restart priority calculator enqueues all virtual machines into restart queues beginning at the leaves of a start order dependency tree and works up the tree structure (i.e., in a topological sort order). Furthermore, the dynamic restart priority calculator load balances virtual machine restarts, while honoring physical location constraints. If however the dynamic restart priority calculator cannot schedule all virtual machine dependency groups, the dynamic restart priority calculator generates an error indicating that recovery is not possible and that additional physical resources need to be added to the recovery environment.

Another example of virtual machine dependency group restart scheduling is to maximize total virtual machine dependency group weight. One objective of scheduling to maximize total virtual machine dependency group weight is to place a set of virtual machine dependency groups into a set of two or more alternate host environments that maximizes the total weight of the placed virtual machine dependency groups. In other words, how many virtual machine dependency groups can the dynamic restart priority calculator fit into one alternate host environment of the set of alternate host environment. The dynamic restart priority calculator separates the different virtual machine dependency groups into anti-affine groups according to the affinity annotation of each respective virtual machine dependency group. In addition, the dynamic restart priority calculator selects an alternate host environment of the set of alternate host environment to restart the anti-affine groups.

For each anti-affine group, the dynamic restart priority calculator trial fits all combinations of virtual machine dependency groups to find a maximum total weight of all virtual machine dependency groups that will fit in the selected alternate host environment. If the number of virtual machine dependency groups is small enough and the trial fit algorithm is efficient enough (e.g., one of mine), then the dynamic restart priority calculator may utilize an exhaustive enumeration of all possible combinations. Alternatively, the dynamic restart priority calculator may utilize a heuristic algorithm.

Further, the dynamic restart priority calculator sorts virtual machine dependency groups in the set of virtual machine dependency groups by total weight. For each virtual machine dependency group in the set, from highest weight to lowest weight, the dynamic restart priority calculator enqueues all virtual machines into restart queues beginning at the leaves of a start order dependency tree and works up the tree structure (i.e., in a topological sort order). Furthermore, the dynamic restart priority calculator load balances virtual machine restarts, while honoring physical location constraints. If however the dynamic restart priority calculator cannot schedule all virtual machine dependency groups, the dynamic restart priority calculator generates an error indicating that recovery is not possible and that additional physical resources need to be added to the recovery environment.

Figure 8:
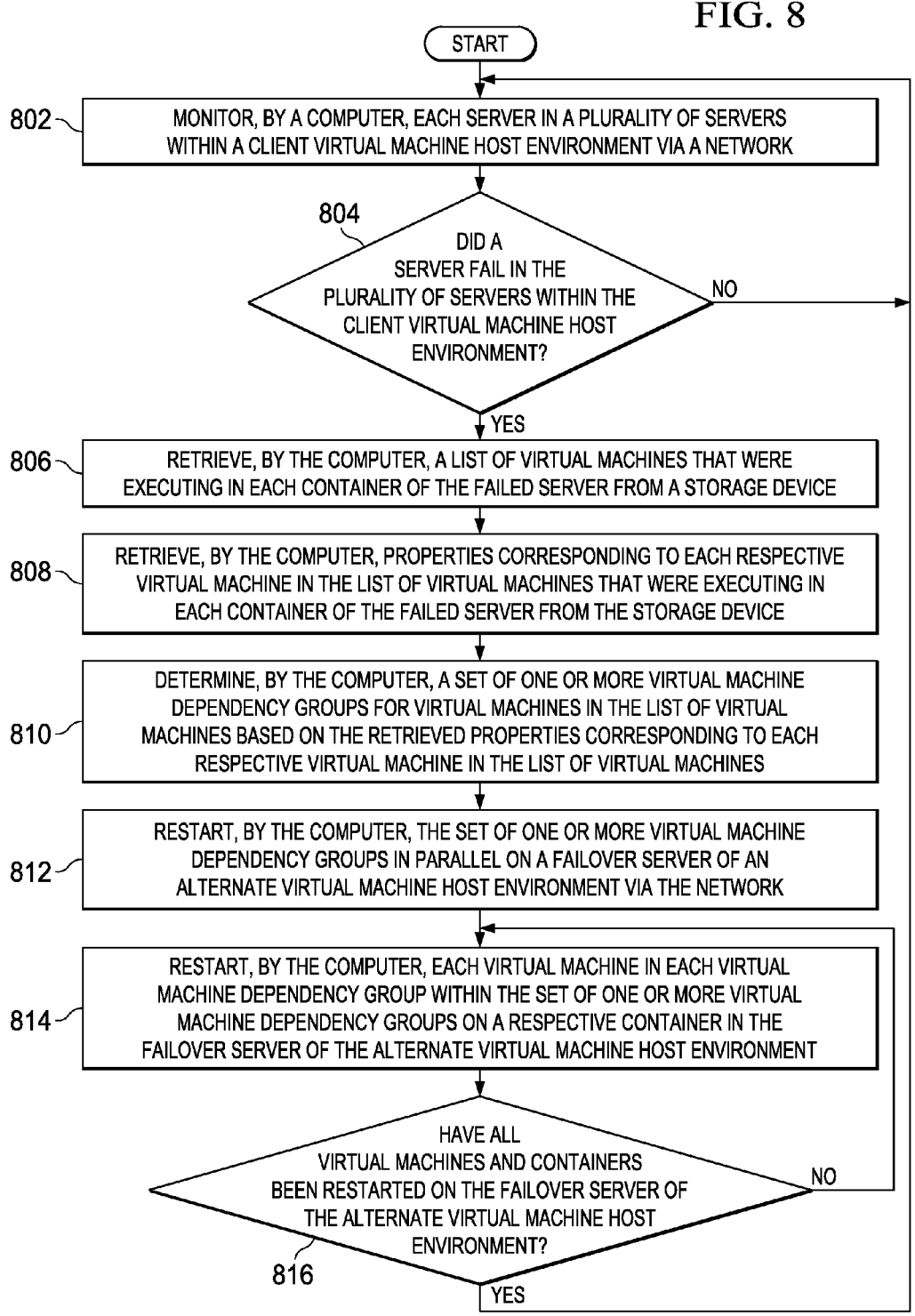
FIG. 8 is a flowchart illustrating a process for parallel restarting of virtual machine dependency groups in accordance with an illustrative embodiment.

With reference now to FIG. 8, a flowchart illustrating a process for parallel restarting of virtual machine dependency groups is shown in accordance with an illustrative embodiment. The process shown in FIG. 8 may be implemented in a computer, such as, for example, server 104 in FIG. 1, data processing system 200 in FIG. 2, and virtual machine remote restart server 302 in FIG. 3.

The process begins when the computer monitors each server in a plurality of servers within a client virtual machine host environment via a network (step 802). The client virtual machine host environment may be, for example, client 110 in FIG. 1. The network may be, for example, network 102 in FIG. 1.

Subsequent to monitoring the plurality of servers in step 802, the computer makes a determination as to whether a server failed in the plurality of servers within the client virtual machine host environment (step 804). If the computer determines that no server failed in the plurality of servers within the client virtual machine host environment, no output of step 804, then the process returns to step 802 where the computer continues to monitor each server in the plurality of servers. If the computer determines that a server did fail in the plurality of servers within the client virtual machine host environment, yes output of step 804, then the computer retrieves a list of virtual machines that were executing in each container of the failed server from a storage device (step 806). The list of virtual machines may be, for example, a list of virtual machines in virtual machines 244 in FIG. 2. The storage device may be, for example, persistent storage 208 in FIG. 2.

In addition, the computer retrieves properties corresponding to each respective virtual machine in the list of virtual machines that were executing in each container of the failed server from the storage device (step 808). The properties corresponding to the virtual machines may be found in, for example, in a set of virtual machine restart rules, such as virtual machine restart rules 224 in FIG. 2. Further, the computer determines a set of one or more virtual machine dependency groups for virtual machines in the list of virtual machines based on the retrieved properties corresponding to each respective virtual machine in the list of virtual machines (step 810). The set of virtual machine dependency groups may be, for example, a set of virtual machine dependency groups in virtual machine dependency groups 258 in FIG. 2.

Furthermore, the computer restarts the set of one or more virtual machine dependency groups in parallel on a failover server of an alternate virtual machine host environment via the network (step 812). The failover server may be, for example, client server 330 in FIG. 3. Moreover, the computer restarts each virtual machine in each virtual machine dependency group within the set of one or more virtual machine dependency groups on a respective container in the failover server of the alternate virtual machine host environment (step 814).

The computer also makes a determination as to whether all virtual machines and containers have been restarted on the failover server of the alternate virtual machine host environment (step 816). If the computer determines that not all virtual machines and containers have been restarted on the failover server of the alternate virtual machine host environment, no output of step 816, then the process returns to step 814 where the computer continues to restart each virtual machine and container in the failover server. If the computer determines that all of the virtual machines and containers have been restarted on the failover server of the alternate virtual machine host environment, yes output of step 816, then the process returns to step 802 where the computer monitors each server in the alternate virtual machine host environment.

Figure 9B:
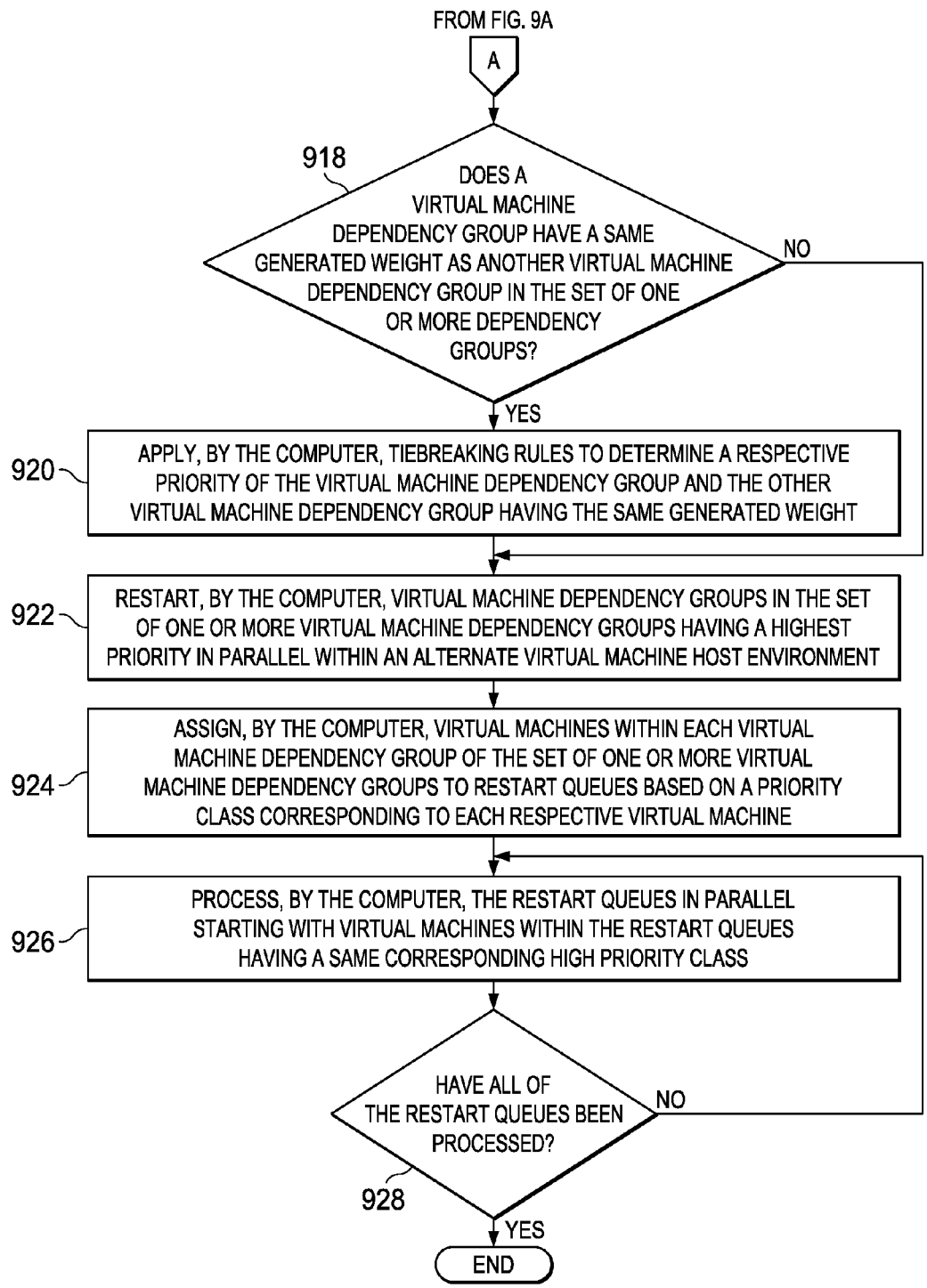

With reference now to FIGS. 9A-9B, a flowchart illustrating a process for determining virtual machine dependency group priority based on weight is shown in accordance with an illustrative embodiment. The process shown in FIGS. 9A-9B may be implemented in a computer, such as, for example, server 104 in FIG. 1, data processing system 200 in FIG. 2, or virtual machine remote restart server 302 in FIG. 3. In addition, the process shown in FIGS. 9A-9B may be implemented in steps 810-814 in FIG. 8.

The process begins when the computer selects a virtual machine dependency group in a set of one or more virtual machine dependency groups corresponding to a failed server in a client virtual machine host environment (step 902). The virtual dependency group may be, for example, a virtual dependency group in virtual machine dependency groups 258 in FIG. 2. The failed server in the client virtual machine host environment may be, for example, failed client server 324 in managed client virtual machine host environment 306 in FIG. 3.

After selecting a virtual machine dependency group in step 902, the computer identifies all virtual machines in the selected virtual machine dependency group (step 904). The virtual machines in the selected virtual machine dependency group may be, for example, virtual machines 402 in FIG. 4. In addition, the computer retrieves restart rules corresponding to each respective virtual machine in the selected virtual machine dependency group from a storage device (step 906). The restart rules may be, for example, virtual machine restart rules 224 in FIG. 2. The storage device may be, for example, persistent storage 208 in FIG. 2.

Subsequent to retrieving the restart rules corresponding to each respective virtual machine in the selected virtual machine dependency group in step 906, the computer aggregates the restart rules corresponding to each respective virtual machine in the selected virtual machine dependency group into a restart rule set for the selected virtual machine dependency group (step 908). Further, the computer generates a directed graph ordering restart of virtual machines in the selected virtual machine dependency group based on the restart rule set for the selected virtual machine dependency group (step 910). The generated directed graph for the selected virtual machine dependency group may be, for example, virtual machine dependency group directed graph 502 in FIG. 5.

Furthermore, the computer generates a weight for the selected virtual machine dependency group based on the restart rule set and directed graph for the selected virtual machine dependency group (step 912). The generated weight for the selected virtual machine dependency group may be, for example, a weight in weights 262 in FIG. 2.

Afterward, the computer makes a determination as to whether another dependency group exists in the set of one or more virtual machine dependency groups (step 914). If the computer determines that another dependency group does exist in the set of one or more virtual machine dependency groups, yes output of step 914, then the process returns to step 902 where the computer selects another dependency group in the set of one or more virtual machine dependency groups. If the computer determines that another dependency group does not exist in the set of one or more virtual machine dependency groups, no output of step 914, then the computer determines a priority of each respective virtual machine dependency group within the set of one or more virtual machine dependency groups based on the generated weight for each respective virtual machine dependency group (step 916).

In addition, the computer makes a determination as to whether a virtual machine dependency group has a same generated weight as another virtual machine dependency group in the set of one or more dependency groups (step 918). If the computer determines that no virtual machine dependency group has a same generated weight as another virtual machine dependency group in the set of one or more dependency groups, no output of step 918, then the process proceeds to step 922. If the computer determines that a virtual machine dependency group does have a same generated weight as another virtual machine dependency group in the set of one or more dependency groups, yes output of step 918, then the computer applies tiebreaking rules to determine a respective priority of the virtual machine dependency group and the other virtual machine dependency group having the same generated weight (step 920).

Then, the computer restarts virtual machine dependency groups in the set of one or more virtual machine dependency groups having a highest priority in parallel within an alternate virtual machine host environment (step 922). The computer also assigns virtual machines within each virtual machine dependency group of the set of one or more virtual machine dependency groups to restart queues based on a priority class corresponding to each respective virtual machine (step 924). The restart queues may be, for example, restart queues 412-418 in FIG. 4. The priority classes may be, for example, priority classes 420-424 in FIG. 4.

Further, the computer processes the restart queues in parallel starting with virtual machines within the restart queues having a same corresponding high priority class (step 926). Furthermore, the computer makes a determination as to whether all of the restart queues have been processed (step 928). If the computer determines that not all of the restart queues have been processed, no output of step 928, then the process returns to step 926 where the computer continues to process the restart queues. If the computer determines that all of the restart queues have been processed, yes output of step 928, then the process terminates thereafter.

Thus, illustrative embodiments provide a computer-implemented method, computer system, and computer program product for generating a parallelized, prioritized restart plan in the event of a failure occurring in the virtual environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for restarting virtual machines, the computer-implemented method comprising:
   monitoring, by a computer, each server in a plurality of servers within a client virtual machine host environment via a network;
   responsive to the computer determining that a server failed in the plurality of servers within the client virtual machine host environment, retrieving, by the computer, a list of virtual machines that were executing in the failed server;
   determining, by the computer, a set of virtual machine dependency groups, in which all virtual machines of a dependency group must be started for an application to function properly, for virtual machines in the list of virtual machines based on properties corresponding to each respective virtual machine in the list of virtual machines;
   responsive to the computer determining a start order dependency, modifying, by the computer, virtual machine weights, within a virtual machine dependency group having the start order dependency, using priority inheritance of a virtual machine weight from a first virtual machine to a second virtual machine that is dependent upon the first virtual machine;
   responsive to the computer determining a virtual machine dependency group prioritization tie between a first virtual machine dependency group and a second virtual machine dependency group, resolving, by the computer, the virtual machine dependency group prioritization tie by preferring a native total weight of the first virtual machine dependency group over an inherited total weight of the second virtual machine dependency group;
   annotating, by the computer, virtual machine dependency groups to indicate mutual virtual machine dependency group affinity requirements that define physical placement requirements of different virtual machine dependency groups;
   generating, by the computer, a virtual machine restart plan that is parallelized and prioritized in which a virtual machine restart priority is based on a total weight generated for each respective virtual machine dependency group using a restart rule set and a directed graph for a selected virtual machine dependency group and the mutual virtual machine dependency group affinity requirements and is a partial ordering of all the virtual machines, which are affected by the failed server in the client virtual machine host environment, into restart priority classes;
   restarting, by the computer executing the virtual machine restart plan, the set of virtual machine dependency groups in parallel on a failover server of an alternate virtual machine host environment via the network; and
   restarting, by the computer further executing the virtual machine restart plan, virtual machines within a particular restart priority class in parallel on a respective restart queue of the set of virtual machine dependency groups on the failover server of the alternate virtual machine host environment via the network.

2. The computer-implemented method of claim 1 further comprising:
   selecting, by the computer, a virtual machine dependency group in the set of virtual machine dependency groups corresponding to the failed server in the client virtual machine host environment.

3. The computer-implemented method of claim 2 further comprising:
   identifying, by the computer, all virtual machines in the selected virtual machine dependency group.

4. The computer-implemented method of claim 2 further comprising:
   retrieving, by the computer, restart rules corresponding to each respective virtual machine in the selected virtual machine dependency group.

5. The computer-implemented method of claim 4 further comprising:
   aggregating, by the computer, the restart rules corresponding to each respective virtual machine in the selected virtual machine dependency group into the restart rule set for the selected virtual machine dependency group.

6. The computer-implemented method of claim 5 further comprising:
generating, by the computer, a directed graph ordering restart of virtual machines in the selected virtual machine dependency group based on the restart rule set for the selected virtual machine dependency group.

7. The computer-implemented method of claim 6 further comprising:
generating, by the computer, a weight for the selected virtual machine dependency group based on the restart rule set and directed graph for the selected virtual machine dependency group.

8. The computer-implemented method of claim 7 further comprising:
determining, by the computer, a priority of each respective virtual machine dependency group within one or more sets of virtual machine dependency groups based on the weight generated for each respective virtual machine dependency group.

9. The computer-implemented method of claim 7 further comprising:
applying, by the computer, tie breaking rules to determine a respective priority of the virtual machine dependency group and another virtual machine dependency group having a same weight generated.

10. The computer-implemented method of claim 9 further comprising:
restarting, by the computer, virtual machine dependency groups in the set of virtual machine dependency groups having a highest priority in parallel within the alternate virtual machine host environment.

11. The computer-implemented method of claim 10 further comprising:
assigning, by the computer, virtual machines within each virtual machine dependency group of the set of virtual machine dependency groups to restart queues based on a priority class corresponding to each respective virtual machine.

12. The computer-implemented method of claim 11 further comprising:
processing, by the computer, the restart queues in parallel starting with virtual machines within the restart queues having a same corresponding high priority class.

13. The computer-implemented method of claim 12 further comprising:
restarting, by the computer, each virtual machine in each virtual machine dependency group within the set of virtual machine dependency groups in the failover server of the alternate virtual machine host environment.

14. A computer system for restarting virtual machines, the computer system comprising:
a bus system;
a storage device connected to the bus system, wherein the storage device stores program instructions; and
a processor connected to the bus system, wherein the processor executes the program instructions to:
monitor each server in a plurality of servers within a client virtual machine host environment via a network;
retrieve a list of virtual machines that were executing in a failed server within the client virtual machine host environment in response to determining that a server failed in the plurality of servers;
determine a set of virtual machine dependency groups, in which all virtual machines of a dependency group must be started for an application to function properly, for virtual machines in the list of virtual machines based on properties corresponding to each respective virtual machine in the list of virtual machines;
modify virtual machine weights, within a virtual machine dependency group having a start order dependency, using priority inheritance of a virtual machine weight from a first virtual machine to a second virtual machine that is dependent upon the first virtual machine in response to determining the start order dependency;
resolve a tie in virtual machine dependency group prioritization by preferring a native total weight of a first virtual machine dependency group over an inherited total weight of a second virtual machine dependency group in response to determining the tie in virtual machine dependency group prioritization between the first virtual machine dependency group and the second virtual machine dependency group;
annotate virtual machine dependency groups to indicate mutual virtual machine dependency group affinity requirements that define physical placement requirements of different virtual machine dependency groups;
generate a virtual machine restart plan that is parallelized and prioritized in which a virtual machine restart priority is based on a total weight generated for each respective virtual machine dependency group using a restart rule set and a directed graph for a selected virtual machine dependency group and the mutual virtual machine dependency group affinity requirements and is a partial ordering of all the virtual machines, which are affected by the failed server in the client virtual machine host environment, into restart priority classes;
restart, by executing the virtual machine restart plan, the set of virtual machine dependency groups in parallel on a failover server of an alternate virtual machine host environment via the network; and
restart, by further executing the virtual machine restart plan, virtual machines within a particular restart priority class in parallel on a respective restart queue of the set of virtual machine dependency groups on the failover server of the alternate virtual machine host environment via the network.

15. A computer program product for restarting virtual machines, the computer program product comprising a computer readable storage medium having program instructions embodied therewith, the program instructions, executable by a computer to cause the computer to perform a method comprising:
monitoring, by the computer, each server in a plurality of servers within a client virtual machine host environment via a network;
responsive to the computer determining that a server failed in the plurality of servers within the client virtual machine host environment, retrieving, by the computer, a list of virtual machines that were executing in the failed server;
determining, by the computer, a set of virtual machine dependency groups, in which all virtual machines of a dependency group must be started for an application to function properly, for virtual machines in the list of virtual machines based on properties corresponding to each respective virtual machine in the list of virtual machines;
responsive to the computer determining a start order dependency, modifying, by the computer, virtual machine weights, within a virtual machine dependency group having the start order dependency, using priority inheritance of a virtual machine weight from a first virtual machine to a second virtual machine that is dependent upon the first virtual machine;

responsive to the computer determining a virtual machine dependency group prioritization tie between a first virtual machine dependency group and a second virtual machine dependency group, resolving, by the computer, the virtual machine dependency group prioritization tie by preferring a native total weight of the first virtual machine dependency group over an inherited total weight of the second virtual machine dependency group;

annotating, by the computer, virtual machine dependency groups to indicate mutual virtual machine dependency group affinity requirements that define physical placement requirements of different virtual machine dependency groups;

generating, by the computer, a virtual machine restart plan that is parallelized and prioritized in which a virtual machine restart priority is based on a total weight generated for each respective virtual machine dependency group using a restart rule set and a directed graph for a selected virtual machine dependency group and the mutual virtual machine dependency group affinity requirements and is a partial ordering of all the virtual machines, which are affected by the failed server in the client virtual machine host environment, into restart priority classes;

restarting, by the computer executing the virtual machine restart plan, the set of virtual machine dependency groups in parallel on a failover server of an alternate virtual machine host environment via the network; and restarting, by the computer further executing the virtual machine restart plan, virtual machines within a particular restart priority class in parallel on a respective restart queue of the set of virtual machine dependency groups on the failover server of the alternate virtual machine host environment via the network.

16. The computer program product of claim 15 further comprising:

selecting, by the computer, a virtual machine dependency group in the set of virtual machine dependency groups corresponding to the failed server in the client virtual machine host environment.

17. The computer program product of claim 16 further comprising:

identifying, by the computer, all virtual machines in the selected virtual machine dependency group.

18. The computer program product of claim 16 further comprising:

retrieving, by the computer, restart rules corresponding to each respective virtual machine in the selected virtual machine dependency group.

19. The computer program product of claim 18 further comprising:

aggregating, by the computer, the restart rules corresponding to each respective virtual machine in the selected virtual machine dependency group into the restart rule set for the selected virtual machine dependency group.

20. The computer program product of claim 19 further comprising:

generating, by the computer, a directed graph ordering restart of virtual machines in the selected virtual machine dependency group based on the restart rule set for the selected virtual machine dependency group.

* * * * *